June 8, 1948.  F. HONERKAMP ET AL  2,443,071
AIR FLOW CONTROL VALVE
Filed Nov. 28, 1944  2 Sheets-Sheet 1
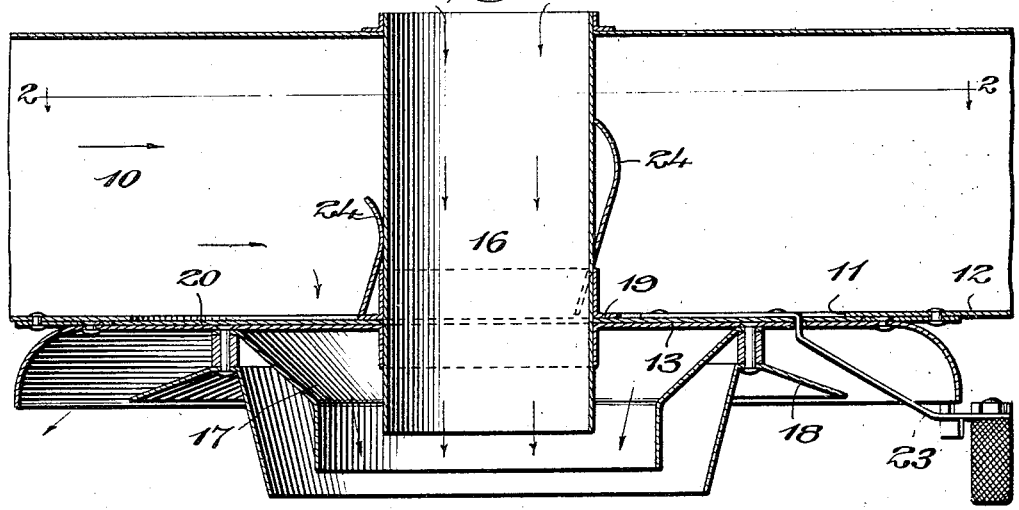
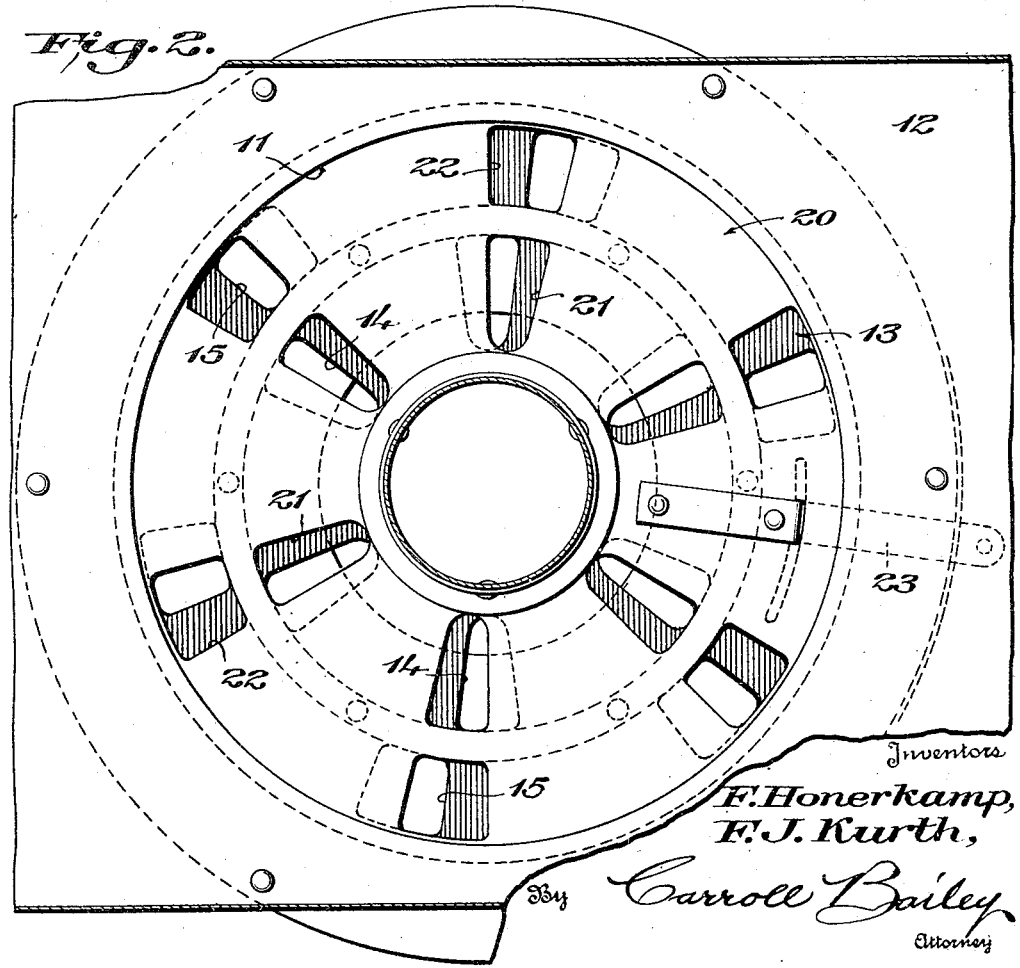
Inventors
F. Honerkamp,
F. J. Kurth,
By Carroll Bailey
Attorney

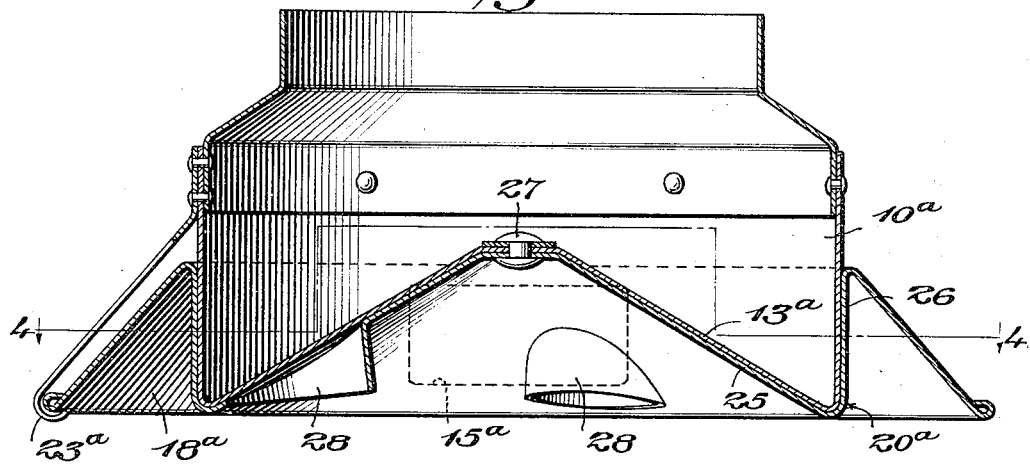
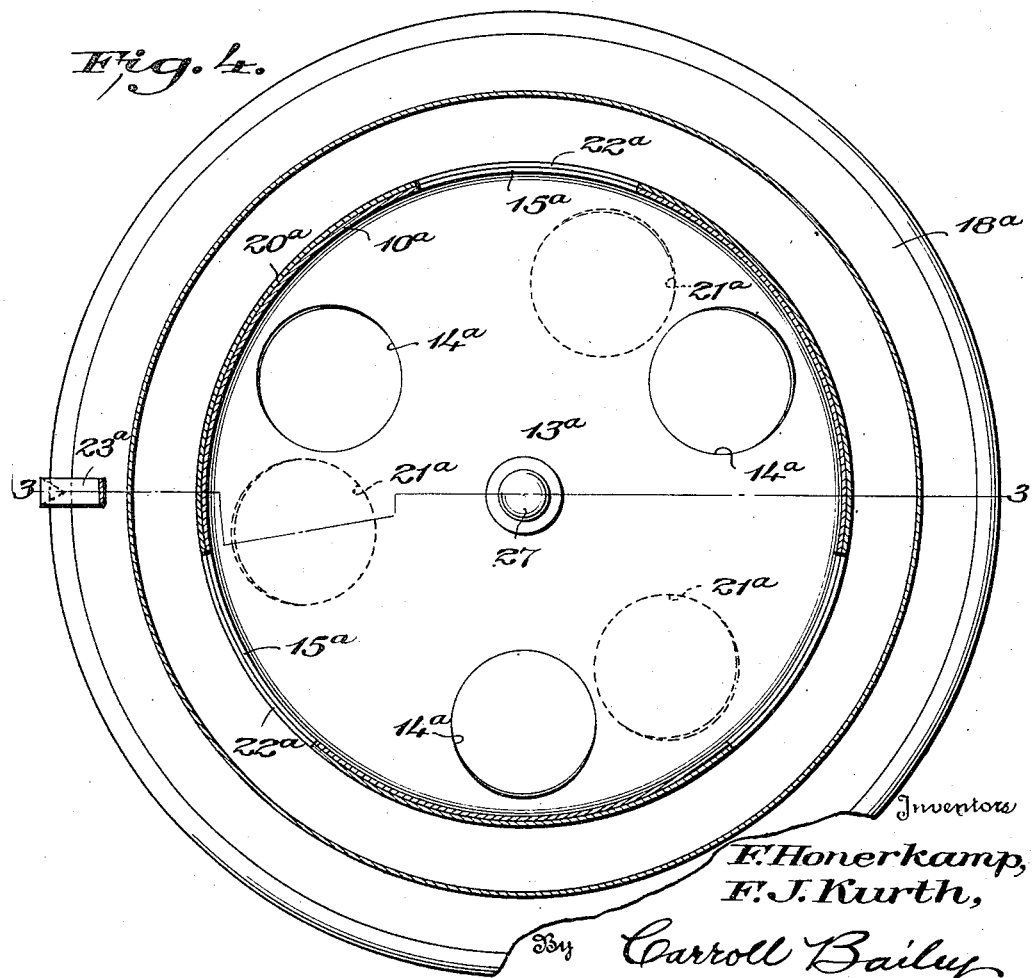

Patented June 8, 1948

2,443,071

UNITED STATES PATENT OFFICE 2,443,071

AIR FLOW CONTROL VALVE

Friedrich Honerkamp and Franz J. Kurth, New York, N. Y., assignors to Anemostat Corporation of America, New York, N. Y., a corporation of Delaware Application November 28, 1944, Serial No. 565,508

3 Claims. (Cl. 251—84)

This invention relates to air flow control valves, particularly for use in association with air outlet devices having two separate sets of air outlet openings, and has for its general object to provide a simple, practical valve which, merely by rotative adjustments of a single element thereof, may be rendered effective to completely close the openings of both sets against any flow of air therethrough; to partly close the openings of either set and simultaneously to partly open the openings of the other set to permit some flow of air through the openings of both sets; to completely close the openings of one set and simultaneously to partly open the openings of the other set to deny all flow through one set and to permit a certain amount of flow through the other set; or to completely close the openings of either set and to fully open the openings of the other set to completely deny flow of air through the openings of either set and to permit full flow of air through the openings of the other set.

With the foregoing general object in view, the invention consists in a valve for the purposes stated embodying the novel features of construction, combination and arrangement of parts as will be hereinafter more fully described, illustrated in the accompanying drawings and defined in the appended claims.

In the accompanying drawings, wherein like characters of reference denote corresponding parts in related views:

Figure 1 is a central, longitudinal section through an air outlet device and a control valve therefor constructed in accordance with one practical embodiment of the invention.

Figure 2 is a section on the line 2—2 of Fig. 1, omitting the air deflector elements shown in Fig. 1.

Figure 3 is a view similar to Fig. 1 illustrating an alternative form of air outlet device and control valve therefor, the section being taken approximately on the line 3—3 of Fig. 4; and Figure 4 is a section on the line 4—4 of Fig. 3.

Referring to the drawings in detail, first with particular reference to the form of the invention illustrated in Figs. 1 and 2, 10 designates a supply duct for cooled or heated, fresh or treated air to be supplied to an enclosure, and 11 designates a circular opening in a wall 12 of said duct for outlet of air therefrom.

Suitably secured to the duct wall 12 in covering relationship to the opening 11 therein, is a flat, circular plate 13, and in this plate are inner and outer, annular, concentric rows of air outlet openings 14 and 15, respectively, which are alined with the opening 11 for outlet of air from the duct 10.

Extending through a central opening in the plate 13 is an open-ended tube 16 the inlet end of which is open to the atmosphere and the outlet end of which is disposed in advance of said plate 13, while fastened to said plate 13 at the outer side thereof in surrounding relationship to the inner annular row of openings 14 therein is a funnel-like air deflecting element 17 for deflecting air flowing from the duct 10 through said inner row of openings 14 toward the outlet end of said tube 16 to induce a flow of atmospheric air therethrough for intermixture with the air discharged through said openings 14. Preferably a second air deflector element 18 is provided to effect outward deflection of air flowing from the duct 10 through the outer annular row of openings 15, this deflector element 18 being, for example, in the form of a flared ring-like plate carried by the plate 13 and lying in advance of the openings 15.

Superimposed upon the plate 13 and suitably mounted for rotation with respect thereto, as, for example, by having its outer marginal portion confined between said plate 13 and the duct wall 12 and its inner marginal portion confined between said plate 13 and a flanged ring 18 fastened to and surrounding the tube 16, is a valve disk 20 which also has therein inner and outer, annular, concentric rows of openings 21 and 22, respectively, for alinement with and disalinement from the openings 14 and 15, respectively, by rotation of said disk.

Any suitable means such as the handle designated as 23 may be provided for rotating the disk 20. In any event, the arrangement of the openings 14, 15, 21 and 22 is such that by rotating said disk to one position, all of the openings 14 and 15 may be closed; by rotating said disk to another position the openings 14 may be completely closed and the openings 15 completely opened; by rotating said disk to another position the openings 15 may be completely closed and the openings 14 completely opened; by rotating said disk to another position the openings 14 may be completely closed and the openings 15 partly opened any desired amounts; and by rotating said disk to other intermediate positions the openings of either row may be partly opened any desired amounts and the openings of the other row partly closed equal amounts.

More particularly, the stated arrangement of the openings 14, 15, 21 and 22, as specifically illustrated in the present instance, is as follows: There are an equal number of openings in each row of both the plate 13 and the valve disk 20; all of the openings are of the same angular length; the openings of the two rows in the disk 20 are angularly alined; the openings of the two rows in the plate 13 are angularly disalined by amounts approximately equal to the angular lengths of said openings, and there are closed portions between adjacent openings in each row approximately twice as long, angularly, as the openings. It follows, therefore, that the disk 20 may be rotated to a position to fully aline its openings 21 with the plate openings 14 and simultaneously to fully disaline its openings 22 from the plate openings 15 so that all flow of air from the duct 10 will be through the inner rows of openings 14, 21; that said disk may be rotated to another position to fully aline its openings 22 with the openings 15 and simultaneously to fully disaline its openings 21 from the openings 14 so that all air flow from the duct 10 will be through the outer rows of openings 15, 22; that said disk may be rotated to an infinite number of intermediate positions to partly aline its openings 14, 15 with the openings 21, 22, respectively, so that any desired proportion of the total volume of air discharged from the duct may be caused to flow through the openings 14, 21 and the remainder through the openings 15, 22; that said disk may be rotated to completely disaline the openings 14, 21 and simultaneously to partly aline the openings 15, 22 any desired amount to deny all flow through the openings 14, 21 and to permit any desired amount of flow through the openings 15, 22; and that said disk may be rotated to still another position to disaline all of its openings from the openings in the plate 13 to cut off all flow of air from the duct 10.

Obviously, the specific arrangement of the openings 14, 15, 21 and 22 shown and described may be varied considerably without changing the described mode of operation of the valve. For example, the openings of either row in either the plate 13 or the valve disk 20 may be displaced angularly relative to the openings of the other row therein any desired amounts and if the openings in the corresponding row in the other of said plate 13 or said valve disk are displaced angularly equal amounts relative to the openings of the other row therein the mode of operation will be the same as described for the arrangement actually shown.

Air deflector elements 24 may be provided to deflect air from the duct 10 through the openings 15 and 14 and any air that is permitted to flow through the openings 15 will be deflected outwardly by the deflector element 18, while any air that is permitted to flow through the openings 14 will be deflected inwardly toward the outlet end of the tube 16 to induce a flow of atmospheric air therethrough for intermixture with the air discharged through the openings 14. In this connection, for a fuller explanation of the general arrangement shown in Figs. 1 and 2, attention is invited to our prior application, Serial No. 498,843, filed August 16, 1943, now Patent Number 2,418,266 granted April 1, 1947, this general arrangement being shown in the present instance merely for the purpose of illustrating one utility of the present valve.

Referring now particularly to the form of the invention illustrated in Figs. 3 and 4 of the drawings, $10^a$ designates a cylindrical neck for connection with an air supply duct, $13^a$ designates a wall closing the outlet end of said neck, and $20^a$ designates a cap-like valve covering the outlet end portion of said neck for controlling flow of air therefrom.

In the end wall $13^a$ is an annular row of air outlet openings $14^a$, while in the side wall of said neck is an annular row of air outlet openings $15^a$. The valve $20^a$ includes an end wall 25 and a side wall 26 and in said walls are annular rows of openings $21^a$ and $22^a$, respectively, for alinement with and disalinement from the openings $14^a$ and $15^a$, respectively, by rotation of said valve relative to said neck. In this connection, the arrangement of said openings $14^a$, $15^a$, $21^a$ and $22^a$ is generally the same as described in connection with the Figs. 1 and 2 form of the invention and, in any event, is such that by rotating the valve $20^a$ to one position, all of the openings $14^a$, $15^a$ may be closed; by rotating said valve to another position the openings $14^a$ may be completely closed and the openings $15^a$ completely opened; by rotating said valve to another position the openings $15^a$ may be completely closed and the openings $14^a$ completely opened; by rotating said valve to another position the openings $14^a$ may be completely closed and the openings $15^a$ opened any desired amounts; by rotating said valve to another position the openings $15^a$ may be completely closed and the openings $14^a$ opened any desired amounts; and by rotating said valve to intermediate positions the openings of both rows may be partly opened.

The valve $20^a$ may be mounted on the neck $10^a$ in any suitable manner for rotation relative thereto as, for example, by means of a rivet, bolt or the like 27 extending centrally through the walls $13^a$ and 25. Moreover, any suitable means, such as the fixed pointer indicated at $23^a$, may be provided for cooperation with suitable index means on the valve $20^a$ to indicate the relationship of the openings $21^a$ to the openings $14^a$ for different rotated positions of said valve $20^a$. Furthermore, any suitable air deflecting means such as the wall indicated at $18^a$ may be provided to cause air discharged through the openings $15^a$, $22^a$ to flow in any desired direction from the device and any other suitable air deflecting means, such as the walls 28 projecting from the wall 25 in surrounding relationship to the openings $21^a$, may be provided to cause air discharged through the openings $14^a$, $21^a$ to flow in any desired direction from the device. In short, Figs. 3 and 4 illustrate the application of a valve, having the characteristics of the valve illustrated in Figs. 1 and 2, to a device of the character shown and described in our copending application, Serial No. 498,842, filed August 16, 1943. Or, stated another way, the valve arrangement shown in Figs. 3 and 4 is essentially the same as the valve arrangement shown in Figs. 1 and 2, except that there are a few number of openings in each row and except that the valve is in the form of a cap rather than in the form of a flat disk.

The end walls $13^a$ and 25 may be flat or they may be of conical form, as shown.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

We claim:

1. Valve means comprising a member of circular shape in cross section having an annular row of openings in its side wall and including an end wall having an annular row of openings therein, a cap engaged over said member and rotatable with respect thereto and including side and end walls having therein annular rows of openings for alinement with and disalinement from the openings in the side and the end walls, respectively, of said member by rotation of said cap relative to said member, the openings in each row of each of said member and said cap being of such angular lengths and being angularly spaced so that the openings of either pair of said rows may be fully alined and the openings of the other pair of said rows may be simultaneously fully disalined, so that the openings of both pairs of said rows may be partly alined simultaneously, so that the openings of both pairs of said rows may be simultaneously fully disalined, and so that the openings of one of said pairs of rows may be completely disalined and the openings of the other of said pair of rows simultaneously fully or partly alined.

2. Valve means comprising a pair of elements one of which is rotatable relative to the other, each of said elements having two annular rows of openings therein for alinement and disalinement, respectively, by rotation of said rotatable element relative to the other element, the openings of each row in each element being of angular lengths and being angularly spaced so that the openings of either row may be fully alined and the openings of the other row simultaneously fully disalined, so that the openings of both rows may be partly alined simultaneously, so that the openings of both rows may be simultaneously fully disalined, and so that the openings of one row may be completely disalined and the openings of the other row simultaneously fully or partly alined.

3. Valve means comprising a pair of elements one of which is rotatable relative to the other, each of said elements having two annular rows of openings therein for alinement and disalinement, respectively, by rotation of said rotatable element relative to the other element, the openings of each row in each element being of angular lengths and being angularly spaced so that the openings of either row may be fully alined and the openings of the other row simultaneously fully disalined, so that the openings of both rows may be partly alined simultaneously, so that the openings of both rows may be simultaneously fully disalined, and so that the openings of either row may be completely disalined and the openings of the other row simultaneously fully or partly alined.

FRIEDRICH HONERKAMP.
FRANZ J. KURTH.

REFERENCES CITED

The following references are of record in the file of this patent:

UNITED STATES PATENTS

| Number | Name | Date |
|---|---|---|
| 1,687,645 | Diederich | Oct. 16, 1928 |
| 1,801,568 | Petrelli | Apr. 21, 1931 |
| 1,801,847 | Carder | Apr. 21, 1931 |
| 2,177,937 | Goldschmidt | Oct. 31, 1939 |
| 2,296,635 | Foehrenbach | Sept. 22, 1942 |